April 24, 1951     R. A. GEISELMAN     2,550,115
REGULATING SYSTEM
Filed Oct. 12, 1946
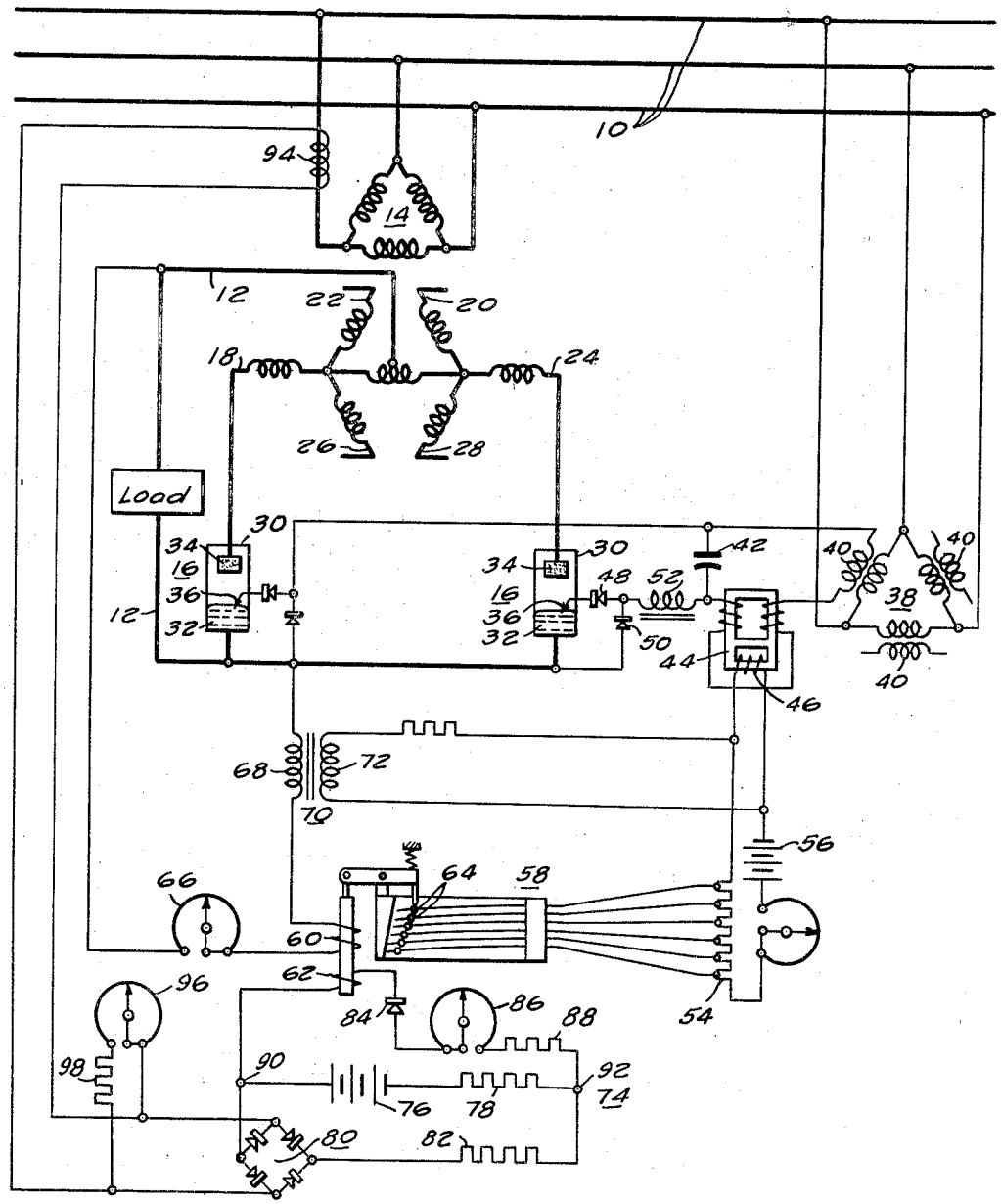
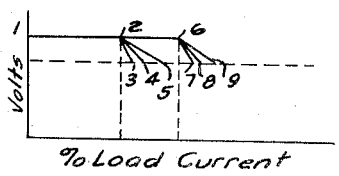
WITNESSES:
INVENTOR
Ralph A. Geiselman.
BY
James N. Ely
ATTORNEY

UNITED STATES PATENT OFFICE 2,550,115

REGULATING SYSTEM

Ralph A. Geiselman, Pittsburgh, Pa., assignor to Westinghouse Electric Corporation, East Pittsburgh, Pa., a corporation of Pennsylvania Application October 12, 1946, Serial No. 703,053

13 Claims. (Cl. 321—16)

This invention relates to regulating systems and in particular to regulating systems for regulating the voltage of a direct-current device along a predetermined pattern.

In practice, most regulating systems are devised to regulate a given quantity over the entire load range. However, where a particular system is enlarged and a number of generating units or conversion units are available, it often becomes desirable to produce a drooping characteristic in the regulating system so that the voltage on the regulated generator or conversion unit will decrease to permit the shifting of load from an overloaded unit to some of the other units which are not carrying excessive loads.

An object of this invention is to provide a regulating system for regulating the output voltage of a load supplying means along a predetermined pattern whereby the voltage characteristic is substantially flat up to a predetermined point and then follows a predetermined droop when such predetermined point is exceeded.

Other objects of this invention will become apparent from the following description when taken in conjunction with the accompanying drawing, in which:

Figure 1 is a schematic diagram of circuits and apparatus embodying the teachings of this invention, and Fig. 2 is a graph, the curves of which illustrate the regulating characteristic of the system of Figure 1.

Referring to the drawing, an alternating-current circuit 10 is connected to a direct-current circuit 12 by means of a transformer 14, the flow of current through the transformer 14 being controlled by a plurality of vapor-electric valves 16 of the make-alive type, only one pair of alternately-conducting valves 16 being illustrated for purposes of simplicity, although it will be understood that all of the phase terminals 18, 20, 22, 24, 26 and 28 of the connecting transformer 14 will normally be supplied with vapor-electric control valves 16.

Each of the valves 16 comprises an evacuated container 30 enclosing a vaporizable reconstructing cathode 32 of suitable material, such as mercury. Cooperating with the cathode 32 is an anode 34 usually of graphite. An excitation electrode 36 is disposed within the container 30 in normal permanent contact with the cathode 32 for periodically initiating a cathode spot. These cathode initiating electrodes 36 are variously called make-alive electrodes, emersion igniter control members, or simply igniters.

The impulse-supplying system for the make-alive electrodes 36 comprises a source of make-alive potential of the same frequency as the potential applied to the main anodes 34, and herein indicated as the alternating-current circuit 10. The control potential is changed to a desired value by means of a suitable means, such as a transformer 38, preferably provided with substantially independent secondary windings 40, each of the secondary windings 40 providing control impulses for a pair of alternately-conducting valves 16.

A so-called firing capacitor 42 is connected across the phase winding 40 of the transformer 38 to be charged therefrom, the current flow therefrom to the capacitor 42 being controlled by a saturable reactor 44. The reactor 44 is provided with a control winding 46 disposed to be energized with direct current for controlling the reactance values of the reactor 44 to produce a phase shift over a relatively wide range.

The discharge circuit for the firing capacitor 42 includes the make-alive electrodes 36 of a pair of alternately-conducting valves 16 in series opposition, polarity responsive means being provided in the circuit therefor in the form of series shunt rectox units 48 and 50 for each of the make-alive electrodes 36, so that positive potential will pass through the make-alive electrode 36 while the inverse potential will be shunted around it.

A saturable reactor 52 is connected in the discharge circuit for the capacitor 42 to produce distorted waves having a narrow peaked characteristic. The system preferably charges the capacitor 42 to alternate negative and positive polarities of substantially equal potential. Therefore, the saturable reactor 52 produces substantially symmetrical positive and negative impulses of substantially equal magnitude.

In order to control the phase-shift reactor 44 to control the output of valves 16, the direct-current control winding 46 is connected through an adjustable resistor 54 to a source of direct current, such as the battery 56. The connections of the resistor 54 are controlled in response to the actuation of a switching mechanism 58 of the type known commercially as the "Silverstat" and disclosed and claimed in Patent No. 2,246,301, issued to C. F. Hanna et al. In the present embodiment, the switching mechanism 58 is provided with two cooperating control windings 60 and 62 for controlling the actuation of the contact members 64 into and out of engagement for controlling the progressive connections to sections of the resistor 54.

As illustrated, the control winding 60 constitutes the main control winding for switching mechanism 58 and is connected through an adjustable resistor 66 and the secondary winding 68 of an anti-hunt transformer 70 across the output of valves 16 to be energized in accordance with the terminal voltage of the converter. The primary winding 72 of anti-hunt transformer 70 is connected across the supply circuit for the direct-current control winding 46 for impressing a potential on the circuit of energizing winding 60 which is proportional to the rate-of-change of the control winding 46 to effectively damp the operation of switching mechanism and preventing hunting.

The auxiliary control winding 62 is disposed to be energized from a bridge circuit 74 in which a constant reference source represented by a battery 76, and a fixed resistor 78 constitutes one leg, the output of a full-wave rectifier 80 and a series connected fixed resistor 82 constitutes the second leg, the series connected control winding 62, rectifier 84, adjustable rheostat 86 and fixed resistor 88 constituting the third leg and being connected intermediate the other two legs at taps 90 and 92 whereby the control winding 62 is energized by a predetermined unbalance condition between the output of rectifier 80 and the reference source 76. The input terminals of the full-wave rectifier 80 are connected across a current transformer 94 to be energized in accordance with the current flow from the source of alternating current to the valves 16. In this instance the transformer 94 is connected in circuit relation with the input to the primary windings of the transformer 14 and a series connected adjustable rheostat 96 and fixed resistor 98 are connected across the input conductors to the full-wave rectifier 80 in parallel circuit relation therewith. The purpose of the adjustable rheostats 86 and 96 will be explained more fully hereinafter.

In the operation of the system shown, the control potential is supplied to the firing capacitor 42 from the source of control potential and the phase of the current charging the capacitor 42 is controlled by varying the impedance of the reactor 44. The discharge of the firing capacitor 42 is controlled by the saturable reactor 52 to produce alternate impulses, and these impulses are selectively applied to the make-alive electrodes 36 by means of the polarity selective network including the series-shunt unidirectional rectifiers 48 and 50 supplied with each of the make-alive electrodes 36.

Assuming that the system is first operating without load, the control winding 60 is energized whereas the auxiliary control winding 62 is deenergized. The energization of the control winding 62 is controlled by the setting of the adjustable taps of rheostats 86 and 96 in the bridge circuit and supply circuit thereto. Thus by adjusting rheostat 96 the output of the full-wave rectifier 80 is controlled and by adjusting rheostat 86 the amount of droop produced by an increase in the load current may be adjusted. Thus with rheostat 96 properly adjusted the bridge circuit will not function to energize auxiliary control winding 62 until a given load is reached depending upon the setting of rheostat 96.

Assume that the rheostat 96 is adjusted so that at 75% load the output of the rectifier 80 equals the output of the reference source or battery 76. Until this point is reached, the main control winding 60 is energized in accordance with the voltage across the valves 16 to effect the actuation of the switching mechanism 58 to control the energization of control winding 46 and thereby control the firing of valves 16 to maintain a substantially constant voltage output as represented by the horizontal line 1—2 or 1—6 of Fig. 2, the points 2 or 6 along the line being determined by the setting of rheostat 96. Thus assuming that point 2 represents 75% load, the control winding 60 is energized to maintain substantially constant voltage output from the valves 16, as described, until 75% load is reached. During this period the auxiliary control winding 62 is substantially deenergized as the current flow from the reference source 76 in the bridge circuit predominates and tap 90 is more positive than tap 92. The current flow through the winding 62 under such conditions is negligible because of the high-back resistance of rectifier 84 and can therefore be ignored in this instance.

When 75% load is reached, the bridge circuit 74 is balanced as the rectifier 80 and the reference source 76 are delivering equal currents and the taps 90 and 92 are at equal potentials. Now if the load current and consequently the current to transformer 14 increases, more current is delivered from the rectifier 80 to create an unbalanced condition in the bridge circuit 74 whereby the potential at tap 92 is more positive than the potential at tap 90 and current flows from tap 92 through resistor 88, rheostat 86, rectifier 84 and control winding 62 to tap 90 to energize the auxiliary control winding.

When control winding 62 is thus energized, it cooperates with control winding 60 to actuate the switching mechanism 58 in a direction to connect sections of resistor 54 in circuit with the control winding 46 of the phase shift reactor 44. The increase in resistance of the control circuit for reactor 44 effects a decrease in the direct current flowing in control winding 46 of reactor 44 to effect a phase shift to cause the valves 16 to fire later and decrease the direct current output voltage of valves 16. As the output voltage of valves 16 is thus decreased, the ampere turns of the main control winding 60 are decreased until the total ampere turns of the two control windings 60 and 62 approach that value normally necessary for maintaining constant voltage up to the 75% load value.

For example, if the switching mechanism 58 requires 500 ampere turns to maintain constant voltage up to 75% load, then when the load exceeds that value, the additional ampere turns of the auxiliary winding 62 are additive to those of the main control winding 60 to effect an operation of the mechanism 58 to so control the phase shifting reactor as to effect a reduction in the output voltage of valves 16. Thus if the increase in load beyond the 75% value selected, effects, say 50 ampere turns in winding 62 the reactor 44 is controlled to cause the voltage output of valves 16 to decrease along one of the predetermined droop lines 2—3, 2—4 or 2—5 of Fig. 2, depending upon the setting of rheostat 86 until the ampere turns of winding 60 approaches 450 ampere turns and the total ampere turns of windings 60 and 62 approach the predetermined value of 500 normally required to maintain constant potential. As will be understood, if the current increases further so that more ampere turns are established in the auxiliary control windings 62, then the output voltage of the valves 16 must be further reduced so that the total ampere turns of both windings 60 and 62 is maintained at the value normally required for maintaining constant voltage up to the selected percentage of load.

The same operation can readily be secured for any point between 75% and 150% load by suitably adjusting the rheostat 96 to determine the point at which the current flow from rectifier 80 equals the current flow from the reference source 76. Likewise, the angle of droop can be predetermined by adjusting the rheostat 86, for it is apparent that by increasing the resistance of rheostat 86 that an increase in the current flow from rectifier 80 is required in order to produce the same number of ampere turns in the auxiliary control winding 62 as is obtained with less resistance in circuit therewith. Thus any angle of droop as represented by the lines 6—7, 6—8 or 6—9 can be obtained at point 6 or corresponding angles of droop as represented by lines 2—3, 2—4 and 2—5 can be obtained at point 2. This system has a definite advantage in that the point and the amount of droop can be predetermined and can be obtained without moving elements or the use of any but standard parts.

I claim as my invention:

1. In a regulating system for regulating the output of an electrical load supplying means, the combination comprising, means disposed to be energized for controlling the output of the electrical load supplying means, switching means disposed to be actuated for controlling the current flow in the output controlling means, a main control winding and an auxiliary control winding disposed to be energized to control the actuation of the switching means, means for connecting the main control winding to be energized in accordance with the output voltage of the electrical load supplying means, and adjustable means connected in circuit relation between the load supplying means and the auxiliary control winding for energizing the auxiliary control winding in accordance with a characteristic of the load current of the electrical load supplying means only after the flow of load current reaches a predetermined value, the windings thereby cooperating to control the output of the electrical load supplying means to maintain the output voltage thereof along a predetermined drooping pattern after said predetermined value of load current is reached.

2. In a regulating system for regulating the output of a direct-current unit supplied from an alternating-current source, the combination comprising, means disposed to be energized for controlling the output of the direct-current unit, switching means disposed to be actuated for controlling the current flow in the output controlling means, a main control winding and an auxiliary control winding disposed to be energized to control the actuation of the switching means, means for connecting the main control winding to be energized in accordance with the output direct-current voltage of the direct-current unit, and adjustable means connected in circuit relation between the alternating-current source and the auxiliary control winding for energizing the auxiliary control winding in accordance with the current flow from the alternating-current source only after said current flow reaches a predetermined value, the windings thereby cooperating to control the output of the direct-current unit to maintain the direct-current voltage thereof in a predetermined drooping pattern after said predetermined value of current flow is reached.

3. In a regulating system for regulating the output of a direct-current unit supplied from an alternating-current source, the combination comprising, means disposed to be energized for controlling the output of the direct-current unit, switching means disposed to be actuated for controlling the current flow in the output controlling means, a main control winding and an auxiliary control winding disposed to be energized to control the actuation of the switching means, means for connecting the main control winding to be energized in accordance with the output direct-current voltage of the direct-current unit, a bridge circuit for energizing the auxiliary control winding in accordance with the current flow from the alternating-current source to the direct-current unit only after said current flow reaches a predetermined value, and means in circuit relation with the bridge circuit and the auxiliary control winding for determining the rate of change in the energization of the auxiliary control winding after said current reaches said predetermined value.

4. In a regulating system for regulating the output of a direct-current unit supplied from an alternating-current source, the combination comprising, means disposed to be energized for controlling the output of the direct-current unit, switching means disposed to be actuated for controlling the current flow in the output controlling means, a main control winding and an auxiliary control winding disposed to be energized to control the actuation of the switching means, means for connecting the main control winding to be energized in accordance with the output direct-current voltage of the direct-current unit, a bridge circuit for energizing the auxiliary control winding in accordance with the current flow from the alternating-current source to the direct-current unit only after said current flow reaches a predetermined value, the bridge circuit comprising a leg including means for converting the alternating current to unidirectional current to provide a source of energizing current for the auxiliary control winding depending upon the current flow from the alternating current source, another leg including a constant source of unidirectional current, and a third leg including the auxiliary control winding and a rectifier connected intermediate the other legs whereby the auxiliary control winding is energized only when the flow of current from the converting means exceeds the flow of current from the constant source.

5. In a regulating system for regulating the output of a direct-current unit supplied from an alternating-current source, the combination comprising, means disposed to be energized for controlling the output of the direct-current unit, switching means disposed to be actuated for controlling the current flow in the output controlling means, a main control winding and an auxiliary control winding disposed to be energized to control the actuation of the switching means, means for connecting the main control winding to be energized in accordance with the output direct-current voltage of the direct-current unit, a bridge circuit for energizing the auxiliary control winding in accordance with the current flow from the alternating-current source to the direct-current unit only after said current flow reaches a predetermined value, the bridge circuit comprising a leg including means for converting the alternating current to unidirectional current to provide a source of energizing current for the auxiliary control winding, means connected in the supply circuit to the converting means for determining the current supplied by the converting means to the bridge circuit, another leg including a constant source of unidirectional current, and a third leg including the auxiliary control winding and a rectifier connected intermediate the other legs whereby the auxiliary control winding is energized only when the flow of current from the converting means exceeds the flow of current from the constant source.

6. In a regulating system for regulating the output of a direct-current unit supplied from an alternating current source, the combination comprising, means disposed to be energized for controlling the output of the direct-current unit, switching means disposed to be actuated for controlling the current flow in the output controlling means, a main control winding and an auxiliary control winding disposed to be energized to control the actuation of the switching means, means for controlling the main control winding to be energized in accordance with the output direct-current voltage of the direct-current unit, a bridge circuit for energizing the auxiliary control winding in accordance with the current flow from the alternating-current source to the direct-current unit only after said current flow reaches a predetermined value, the bridge circuit comprising a leg including means for converting the alternating current to unidirectional current to provide a source of energizing current for the auxiliary control winding, means connected in the supply circuit to the converting means for determining the current supplied by the converting means to the bridge circuit, another leg including a constant source of unidirectional current, a third leg including the auxiliary control winding and a rectifier connected intermediate the other legs whereby the auxiliary control winding is energized only when the flow of current from the converting means exceeds the flow of current from the constant source, and means connected in the intermediate leg of the bridge circuit for determining the rate of change in the energization of the auxiliary control winding.

7. In a regulating system for a direct-current load circuit supplied by a pair of alternately-conducting vapor-electric valves from a source of alternating current, the combination comprising, a control system including a phase shifting network for controlling the firing of the valves, a variable reactor in the phase shifting network, a direct-current control winding for the reactor, means having a plurality of windings disposed to be energized for controlling the current flow in the direct-current control winding, one of said plurality of windings being disposed to be energized in accordance with the voltage output of the valves, and adjustable means connected in circuit relation between the alternating-current source and the other of said plurality of control windings for energizing the other of said plurality of control windings in accordance with the current flow from said source of alternating current only after such flow reaches a predetermined value, the windings cooperating after the predetermined value of current flow is reached to effect the control of the current flow in the direct-current winding of the reactor to control the firing of the valves to effect a reduction in the voltage output of the valves and limit the current flow in the load circuit.

8. In a regulating system for a direct-current load circuit supplied by a pair of alternately-conducting vapor-electric valves from a source of alternating current, the combination comprising, a control system including a phase shifting network for controlling the firing of the valves, a variable reactor in the phase shifting network, a direct-current control winding for the reactor, a control switching means disposed to be actuated for controlling the current flow in the direct-current control winding, a main control winding and an auxiliary winding for the switching means, the main control winding being disposed to be energized in accordance with the voltage output of the valves, a bridge circuit for energizing the auxiliary control winding in accordance with the current flow from the source of alternating-current to the valves only after said current flow reaches a predetermined value, the bridge circuit comprising a leg including means for converting the alternating-current to a unidirectional current to provide a variable source of energizing current for the auxiliary control winding depending upon the current flow from the alternating-current source, another leg including a constant source of unidirectional current, and a third leg including the auxiliary control winding and a rectifier connected intermediate the other legs whereby the auxiliary control winding is energized only when the flow of current from the converting means exceeds the flow of current from the constant source.

9. In a regulating system for a direct-current load circuit supplied by a pair of alternately-conducting vapor-electric valves from a source of alternating current, the combination comprising, a control system including a phase shifting network for controlling the firing of the valves, a variable reactor in the phase shifting network, a direct-current control winding for the reactor, a control switching means disposed to be actuated for controlling the current flow in the direct-current control winding, a main control winding and an auxiliary winding for the switching means, the main control winding being disposed to be energized in accordance with the voltage output of the valves, a bridge circuit for energizing the auxiliary control winding in accordance with the current flow from the source of alternating-current to the valves only after said current flow reaches a predetermined value, the bridge circuit comprising a leg including means for converting the alternating-current to a unidirectional current to provide a variable source of energizing current for the auxiliary control winding depending upon the current flow from the alternating-current source, means connected in the supply circuit to the converting means for determining the current supplied by the converting means, another leg including a constant source of unidirectional current, and a third leg including the auxiliary control winding and a rectifier connected intermediate the other legs whereby the auxiliary control winding is energized only when the flow of current from the converting means exceeds the flow of current from the constant source.

10. In a regulating system for a direct-current load circuit supplied by a pair of alternately-conducting vapor-electric valves from a source of alternating current, the combination comprising, a control system including a phase shifting network for controlling the firing of the valves, a variable reactor in the phase shifting network, a direct-current control winding for the reactor, a control switching means disposed to be actuated for controlling the current flow in the direct-current control winding, a main control winding and an auxiliary winding for the switching means, the main control winding being disposed to be energized in accordance with the voltage output of the valves, a bridge circuit for energizing the auxiliary control winding in accordance with the current flow from the source of alternating-current to the valves only after said current flow reaches a predetermined value, the bridge circuit comprising a leg including means for converting the alternating-current to a unidirectional current to provide a variable source of energizing current for the auxiliary control winding depending upon the current flow from the alternating-current source, means connected in the supply circuit to the converting means for determining the current supplied by the converting means, another leg including a constant source of unidirectional current, a third leg including the auxiliary control winding and a rectifier connected intermediate the other legs whereby the auxiliary control winding is energized only when the flow of current from the converting means exceeds the flow of current from the constant source, and means connected in the intermediate leg of the bridge circuit for determining the rate of change in the energization of the auxiliary control winding.

11. In a regulating system for regulating the output of an electrical load supplying means, the combination comprising, means disposed to be energized for controlling the output of the electrical load supplying means, switching means disposed to be actuated for controlled the current flow in the output controlling means, a main control winding and an auxiliary control winding for the switching means, the main control winding being disposed to be energized in accordance with the voltage output of the load supplying means, a bridge circuit for energizing the auxiliary control winding in accordance with the current flow to the load supplying means only after said current flow reaches a predetermined value, the bridge circuit comprising a leg including means for supplying unidirectional current dependent upon said current flow to the load supplying means to provide a source of energizing current for the auxiliary control winding, another leg including a constant source of unidirectional current, and a third leg including the auxiliary control winding and a rectifier connected intermediate the other legs whereby the auxiliary control winding is energized only when the flow of current from said unidirectional current supply means exceeds the flow of current from the constant source.

12. In a regulating system for regulating the output of an electrical load supplying means, the combination comprising, means disposed to be energized for controlling the output of the electrical load supplying means, switching means disposed to be actuated for controlling the current flow in the output controlling means, a main control winding and an auxiliary control winding for the switching means, the main control winding being disposed to be energized in accordance with the voltage output of the load supplying means, a bridge circuit for energizing the auxiliary control winding in accordance with the current flow to the load supplying means only after said current flow reaches a predetermined value, the bridge circuit comprising a leg including means for supplying unidirectional current dependent upon said current flow to the load supplying means to provide a source of energizing current for the auxiliary control winding, another leg including a constant source of unidirectional current, a third leg including the auxiliary control winding and a rectifier connected intermediate the other legs whereby the auxiliary control winding is energized only when the flow of current from said unidirectional current supply means exceeds the flow of current from the constant source, and means connected in the intermediate leg of the bridge circuit for determining the rate of change in the energization of the auxiliary control winding.

13. In a regulating system for regulating the output of an electrical load supplying means, the combination comprising, means disposed to be energized for controlling the output of the electrical load supplying means, switching means disposed to be actuated for controlling the current flow in the output controlling means, a main control winding and an auxiliary control winding disposed to be energized to control the actuation of the switching means, means for connecting the main control winding to be energized in accordance with the output voltage of the electrical load supplying means, a bridge circuit for energizing the auxiliary control winding in accordance with the current flow from the load supplying means only after said current flow reaches a predetermined value, the bridge circuit comprising a leg including means for providing a source of unidirectional energizing current for the auxiliary control winding depending upon the current flow from the load supplying means, another leg including a constant source of unidirectional current, and a third leg including the auxiliary control winding and a rectifier connected intermediate the other legs whereby the auxiliary control winding is energized only when the flow of current from the source of unidirectional energizing current exceeds the flow of current from the constant source.

RALPH A. GEISELMAN.

REFERENCES CITED

The following references are of record in the file of this patent:

UNITED STATES PATENTS

| Number | Name | Date |
| --- | --- | --- |
| 1,865,562 | Gilson | July 5, 1932 |
| 2,276,810 | Wade | Mar. 17, 1942 |
| 2,306,998 | Claesson | Dec. 29, 1942 |
| 2,318,091 | Myers | May 4, 1943 |
| 2,351,910 | Blankenbuehler | June 20, 1944 |
| 2,394,013 | Rose | Feb. 5, 1946 |